Figure 1:
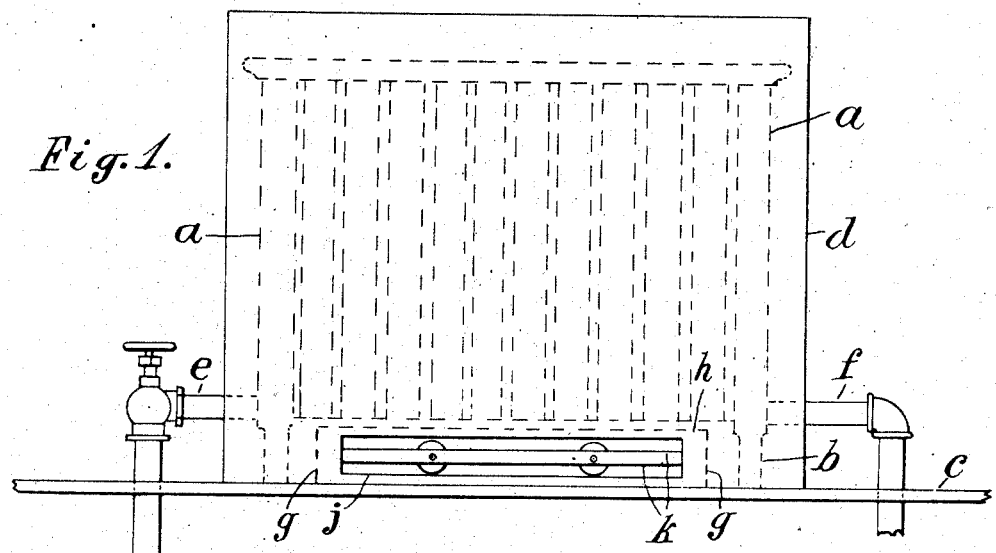

J. B. McKEOWN.
AUTOMATIC CONTROL OF HEAT FROM RADIATORS.
APPLICATION FILED SEPT. 18, 1907.

908,797.

Patented Jan. 5, 1909.

3 SHEETS—SHEET 1.

Witnesses:
L. Lee.
J. W. Greenbaum.

Inventor.
Joseph B. McKeown,
per Thomas S. Crane, Atty.

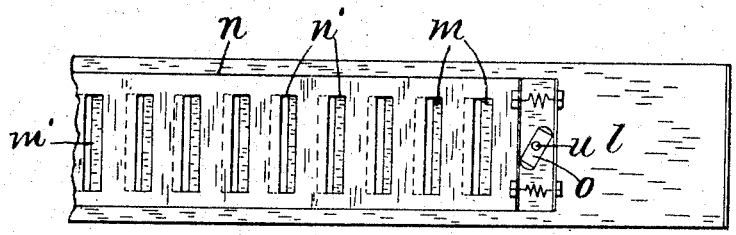
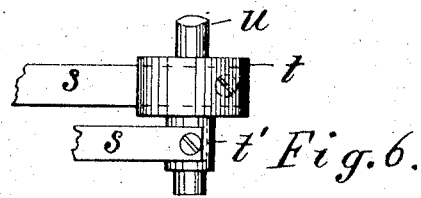
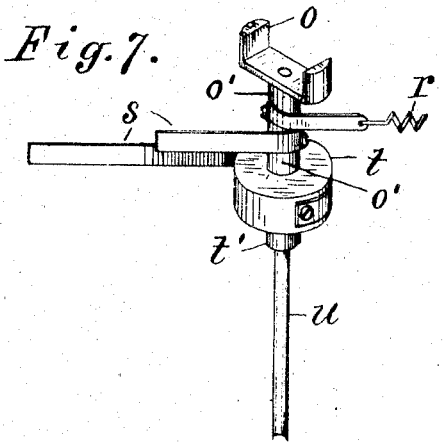

J. B. McKEOWN.
AUTOMATIC CONTROL OF HEAT FROM RADIATORS.
APPLICATION FILED SEPT. 18, 1907.

908,797.

Patented Jan. 5, 1909.

3 SHEETS—SHEET 3.

UNITED STATES PATENT OFFICE.

JOSEPH B. McKEOWN, OF UNION HILL, NEW JERSEY.

AUTOMATIC CONTROL OF HEAT FROM RADIATORS.

No. 908,797. Specification of Letters Patent. Patented Jan. 5, 1909.

Application filed September 18, 1907. Serial No. 393,4

*To all whom it may concern:*

Be it known that I, JOSEPH B. McKEOWN, a citizen of the United States, residing at 387 Bullsferry road, Union Hill, county of Hudson, and State of New Jersey, have invented certain new and useful Improvements in Automatic Control of Heat from Radiators, fully described and represented in the following specification and the accompanying drawings, forming a part of the same.

This invention relates to a means of automatically regulating the temperature of the air in a room which is provided with a heating radiator, and the invention operates without varying the supply of heating fluid to the radiator.

In this invention, the temperature of the air in the room is regulated by inclosing the radiator in a casing and circulating the air more or less through the casing in accordance with the temperature of the room. The apparatus consists of the radiator which is supplied continuously with the heating fluid so as to be kept at a substantially constant temperature, a casing inclosing the radiator with an outlet at the top for the heated air and an inlet at the bottom having a feed-box connected thereto, with a damper upon the feed-box for admitting the air of the room to the casing, and a thermostat in the feed-box with connections to the damper for opening the same in proportion as the air in the room becomes cooled.

Heretofore, thermostats have been used in connection with heating apparatus for opening and closing the valve which supplies the heating fluid and also for opening and closing a damper which admits air from the exterior of the room, and I do not therefore claim the combination of a thermostat with a valve or damper; but my invention avoids all connections for supplying air from the exterior of the room and furnishes attachments which can be applied to any radiator which is already in use in an apartment, and operate to regulate the temperature of the apartment in the desired manner.

Where the thermostat operates upon the steam or water-valve, its operation results at times in cutting off the heating fluid entirely, so that the radiator becomes cold and considerable time is required to re-heat the radiator when the room becomes cooled. The present invention not only avoids this difficulty but obviates the expense of conducting an air supply from the exterior of the building to the radiator.

By my construction the supply of heating fluid to the radiator is not varied and no supply of exterior air is required, but the temperature of the room is varied and controlled by automatically regulating the flow of such air from the room into the radiator casing and out of the same when heated.

Figure 2:
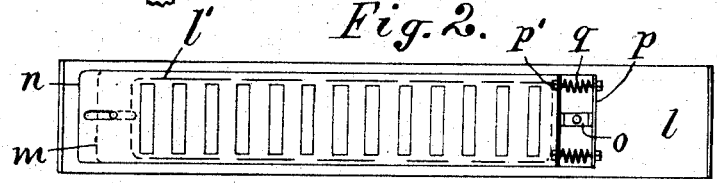
Figure 3:
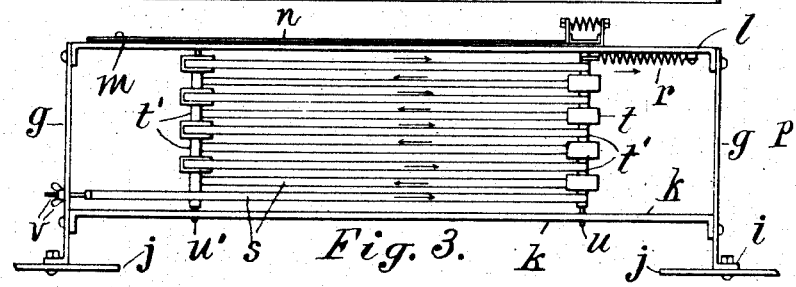
Figure 2A:
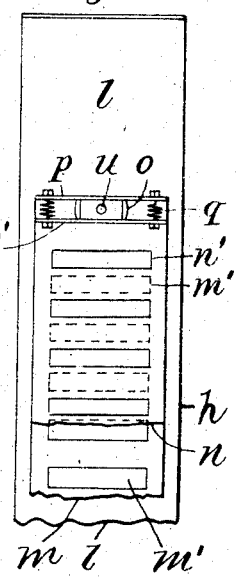
Figure 4:
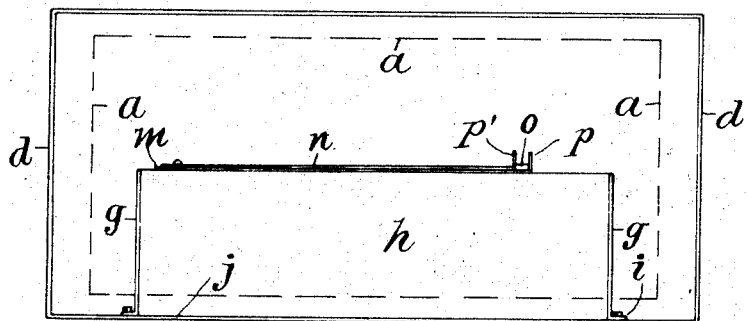
Figure 8:
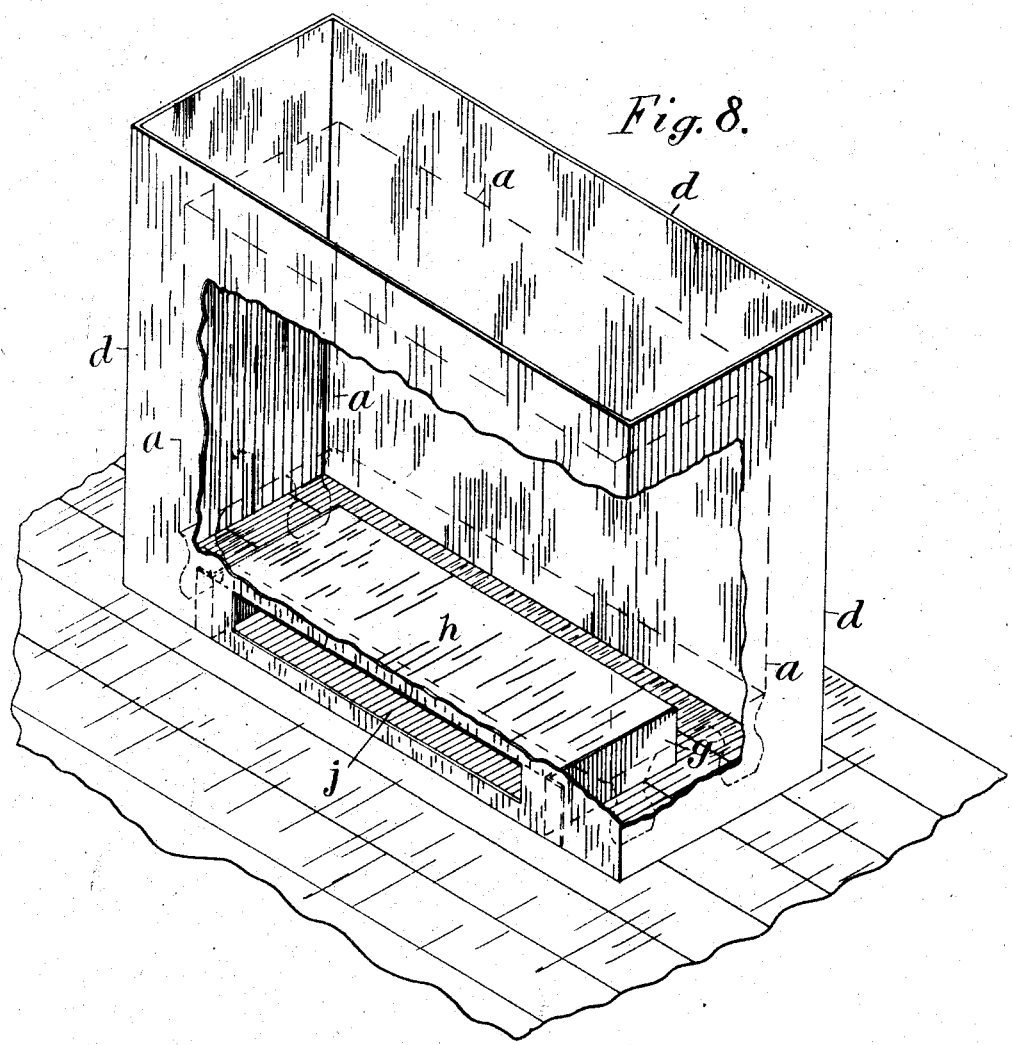

In the drawing, Figure 1 is an elevation of a regulator casing containing a radiator and the regulating apparatus; Fig. 2 shows the inner end of the feed-box which delivers the air of the room into the radiator casing, the view being taken in the direction of the damper on the upper side of Fig. 3; and showing the damper opened; Fig. 2$^a$ shows one end of a similar plan enlarged, with the damper closed; Fig. 3 is a plan of the feed-box with the top removed to expose the thermostat fixtures; Figs. 2 and 3 being upon a larger scale than Fig. 1, and Fig. 2$^a$ upon a still larger scale. Fig. 4 is a plan of the radiator casing and feed-box upon a smaller scale than Fig. 3, with dotted lines indicating the position of the radiator within the casing above the feed-box; Fig. 5 is a view similar to Fig 2$^a$ with the damper partly opened; Fig. 6 is an enlarged view of one of the thermostat spools and bands; Fig. 7 is a perspective view of the parts which operate directly upon the damper; and Fig. 8 is a perspective view of the whole construction as shown in Fig. 1, excepting the front of the casing where it is broken away to expose the feed-box, the radiator being indicated in outline by dotted lines only, for the same purpose.

$a$ designates the radiator with its legs $b$ resting upon the floor $c$. The casing $d$ is shown surrounding the radiator and extending to the floor and the supply-pipe $f$ extended through the ends of the casing. The casing is entirely open at the top, or otherwise formed with an outlet for the heated air and a feedbox having ends $g$ and a top $h$ is shown within the bottom of the casing between the legs of the radiator, and attached to the front of the casing by lugs $i$. An aperture $j$ is shown in the casing between the lugs $i$, and admits air into the feedbox passing above and below a bearing-bar $k$ which extends across the feedbox inside the aperture $j$.

The inner end of the feedbox is provided with a plate $l$ having an aperture $l'$ therethrough, and damper slides $m$ and $n$ are shown mounted upon the plate $l$ over the aperture $l'$. The damper slides are provided respectively with slots $m'$ and $n'$, which when coincident permit air from the room to pass through the box and through the slots into the radiator casing below the radiator. Two damper slides with slots $m'$ and $n'$ are used to secure a full opening of the slots with a movement of only one-half their width. When the radiator is heated, its effect upon the temperature of the room is largely dependent upon the opening of these dampers, as the flow of air over the heated radiator tends to raise the temperature of the apartment. To operate the dampers, a thermostat is provided in the feed-box constructed as follows; a cross head $o$ is mounted by a shank $o'$ in a bearing in the plate $l$, the shank being extended through a slot in the slide $m$, and the crosshead lying between ears $p$ and $p'$ formed upon the slides $m$ and $n$ at opposite sides of the crosshead. The ears are pressed normally toward one another and toward the crosshead $o$ by springs $q$, which springs tend to move the slots $m'$ and $n'$ into coincidence. The shank of the crosshead is turned, by a spring $r$, normally into the position shown in Fig. 2; to close the slots and shut off the movement of air through the feedbox. The movement of the crosshead is automatically controlled by the expansion and contraction of metallic bands $s$ extended between two series of spools $t$ and $t^2$, which are mounted to turn loosely upon two parallel spindles $u$ and $u'$. The band at one end of the series is attached to the shank $o'$ of the crosshead, and at the opposite end to an adjusting screw $v$. Each spool, as shown in Fig. 5, is provided with a hub $t'$, and the opposite ends of the bands are connected respectively to the reverse sides of the spools and hubs upon the opposed spindles. By this construction, the contraction of the bands under a reduction of temperature, which is secured by making them of suitable metal, like sheet zinc, is gradually exaggerated so as to turn the crosshead $o$ nearly a quarter turn in a variation of ten degrees Fah. of temperature. The contraction of the bands expands the spring $r$ and operates to open the slots $m,'$ and $n'$. Within a smaller range of temperature than ten degrees, the crosshead is turned into an oblique position, and the shutter-slots are thus more or less opened or closed as shown in Fig. 5. The falling of temperature in the room, which supplies the air to the feedbox, thus causes a retraction of the bands and an opening of the damper slots, which thus permit a current of air to pass through the radiator casing $d$. As the radiator is kept constantly heated, such air is instantly heated and the temperature of the room is very quickly affected, and raised to a point where the flow of the air into the feedbox operates to expand the thermostat bands and permits the spring $r$ to wholly or partially close the damper slots.

From the above description it will be seen that the location of the thermostat within the feed-box causes it to be affected by the current of air inflowing from the room, so that the opening of the damper is proportioned to the lowering of the temperature of such air, and the volume of heat conveyed from the radiator into the room is correspondingly proportioned.

The radiator shown is one of an ordinary type comprised of a series of vertical sections with feet upon the end sections between which a feed-box can be readily inserted, and my present construction is therefore such that it can be readily proportioned to fit any radiator already located in a room, and when applied to such a radiator operates to automatically regulate the temperature of the room. The device may therefore be regarded as an attachment for radiators, operating independently of all agencies exterior to the room and requiring only that the radiator should be continuously supplied with the heating fluid.

Having thus set forth the nature of the invention what is claimed herein is:

1. The combination, with a radiator arranged in a room and kept constantly heated, of the casing $d$ surrounding the radiator and having an outlet at the top and an inlet near the bottom admitting air from the room within the casing, the radiator having legs near the opposite ends of the casing, the feed-box $g$ extended from the inlet within the bottom of the casing between the said legs, a thermostat located within the feed-box in the current of air entering from the room, and a damper controlled by the thermostat and operating to vary or cut off the passage of air through the casing, substantially as herein set forth.

2. The combination, with a radiator situated in a room and kept constantly heated, of the casing $d$ surrounding the radiator and having an outlet at the top and an inlet $j$ near the bottom, the radiator having legs near the opposite ends of the casing, the feed-box $g$ extended from the inlet within the bottom of the casing between the legs of the radiator and having the sliding damper $n'$ opening into the bottom of the casing, and a thermostat located within the feed-box and connected to the damper, the whole arranged and operated substantially as herein set forth.

In testimony whereof I have hereunto set my hand in the presence of two subscribing witnesses.

JOSEPH B. McKEOWN.

Witnesses:
L. LEE,
THOMAS S. CRANE.